Feb. 8, 1966   C. R. CONRY   3,233,797
MEASURING POURER HAVING A GRAVITY OPERATED VALVE
Filed June 9, 1964
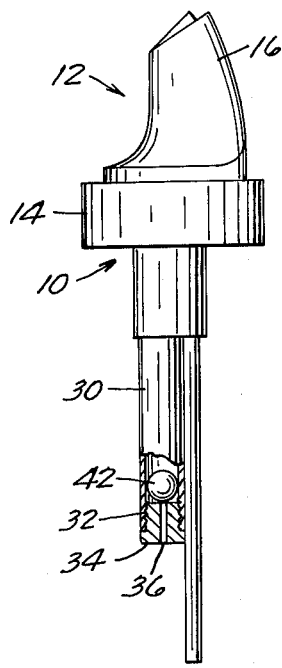
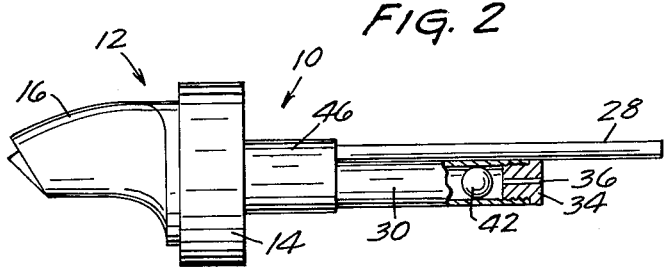
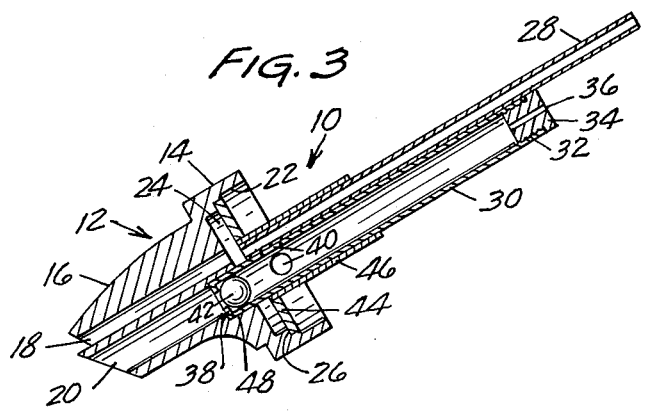
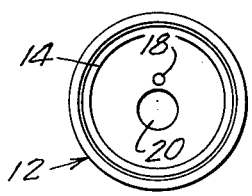
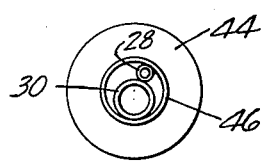
INVENTOR
CHARLES R. CONRY
BY
Donald M. Sell
ATTORNEY

United States Patent Office 3,233,797
Patented Feb. 8, 1966

3,233,797
MEASURING POURER HAVING A GRAVITY
OPERATED VALVE
Charles R. Conry, 811 Manhattan Road, Joliet, Ill.
Filed June 9, 1964, Ser. No. 373,665
3 Claims. (Cl. 222—477)

This invention relates to a pourer for dispensing liquid from the mouth of a bottle. More particularly, this invention relates to a novel and useful measuring pourer which retains the appearance and compactness of a free-flow pourer.

In the dispensing of many liquids, particularly relatively expensive liquids such as alcoholic beverages, it is customary to use pourers mounted on the tops of bottles to assist in dispensing the liquid with minimum spillage and guided flow. Since these pourers are generally free-flow, i.e. the liquid continuing to flow therefrom so long as the bottle remains tilted, the liquid, in the event it's an alcoholic beverage, is customarily dispensed into a measuring vessel of fixed volume, as for example ½ oz., ¾ oz., 1 oz., etc., and the contents of the measuring container thereafter emptied into a serving glass or the like.

This procedure of pouring the liquid from the bottle to a measuring container and thence to the glass or other vessel in which the beverage is to be served is sometimes a tedious time-waster, as when a good many beverages are to be dispensed in a short period of time. Consequently, in the dispensing of alcoholic beverages many bartenders will often try to sight-measure the amount of beverage by pouring directly into a glass or the like, dispersing with the use of a separate measuring container. To the customer, this is often considered a desirable procedure in the belief that the bartender tends to err on the side of generosity rather than on the side of parsimoniousness.

Many pourers have been made which attempt to combine with the pouring function a measuring function such as is usually performed by the measuring container. However, most of these prior known measuring pourers are so bulky and conspicuous, and/or undependable or difficultly cleaned that their use is looked upon with some trepidation. Further, they can measure only a single fixed volume of liquid.

It is a principal object of the present invention to provide a measuring pourer which preserves the appearance of a free-flowing pourer while accurately and dependably measuring the amount of beverage dispensed with each tilting of the pourer.

A further object of the invention is to provide a simple, compact, economical, readily cleaned and serviced, measuring pourer for dispensing liquid from the mouth of the bottle which pourer can readily be adapted to measure varying amounts of liquid to be poured with each tilting of the pourer.

A still further object of the invention is to provide a measuring pourer with a novel venting arrangement which avoids any liquid flow from the vent opening during pouring.

The foregoing, as well as other objects and advantages which will become apparent as the description proceeds, are attained by this invention, a preferred embodiment of which is illustrated in the accompanying drawing wherein:

FIGURE 1 is an upright view of the measuring pourer with certain parts being broken away for clarity of detail;

FIGURE 2 is a view similar to FIGURE 1 of the pourer in a horizontal position as it is being tilted from the vertical, again with certain parts being broken away for clarity of detail of its operation;

FIGURE 3 is a lengthwise cross sectional view through the pourer of FIGURES 1 and 2 showing the pourer in a position tilted beyond the horizontal from the vertical wherein further flow of liquid through the pourer is shut off;

FIGURE 4 is a top view of the pourer;

FIGURE 5 is a bottom view of the vent and pouring tube assembly of the pourer; and FIGURE 6 is a cross sectional view through the pouring tube adjacent the upper end thereof taken substantially along the section line illustrated in FIGURE 3.

Referring now to the accompanying drawing in detail, there is illustrated in FIGURES 1–3 a measuring pourer made in accordance with the teachings of this invention which is designated in its entirety by the numeral 10. The pourer comprises in essence a pourer body 12 having a base 14, comprising a downwardly depending peripheral flange for seating on top of a bottle, and a pouring spout 16. Conveniently, this pourer body 12 may take the form of a single casting.

The pourer spout 16 is formed with a vent bore 18 therethrough and a pouring bore 20 therethrough.

The base 14 of the pourer body 12 is hollowed out to form a wide mouthed cylindrical recess 22 which forms the inner surface of the wall of the depending flange. The recess 22 is stepped inwardly to provide an inner chamber 24 of smaller diameter than recess 22, annular shoulder 26 forming the step between the recess 22 and the inner chamber 24.

As illustrated particularly in FIGURES 1–3, there depends from the body 12 of the pourer 10 for penetration into a bottle on which the pourer is mounted a vent and pouring tube assembly comprising a vent tube 28 and a pouring tube 30, the upper ends of which, as is particularly apparent from FIGURE 3, intercommunicate respectively with the vent opening 18 and the pouring opening 20 of the pourer body 12.

The lower end of the pouring tube 30 is threaded as at 32 and a removable plug 34 threaded into the lower end of the pouring tube 30 closes off this lower end. The plug 34 has an opening 36 centrally thereof communicating with the interior of the tube 30. At its upper end the pouring tube 30 is provided with a ball seat 38 and adjacent its upper end it is further provided with a plurality of openings 40 in the side wall thereof for admitting liquid into the pouring tube. A solid metal ball or the like 42 rides freely within the tube 30.

The operation of the pourer is extremely simple. As will be noted in FIGURE 1, when the pourer is upright, the ball 42 rests against the closing plug 34. As the pourer is tilted as illustrated in FIGURE 2 the ball moves off the plug 34 and as the pourer continues to be tilted beyond the horizontal as shown in FIGURE 3 the ball moves toward the ball seat 38 at the upper end of the pouring tube 30 and, upon seating thereagainst, prevents further passage of liquid therethrough.

As the pourer is tilted liquid to be dispensed pours from the bottle through the openings 40 in the pouring tube 30 and creates a vacuum within the tube preventing movement of the ball toward the ball seat. As liquid seeps in the opening 36 of the plug, the vacuum is relieved and the ball 42 begins its movement along the tube, finally reaching the ball seat 38. The rate of movement of the ball is dependent upon the size of the opening 36 in the plug 34; and thus upon the rapidity of liquid seepage therethrough. With this arrangement, by utilizing plugs 34 having different sized openings 36, the amount of liquid to be dispensed from the pourer in each pouring operation, e.g. ½ oz., ¾ oz., 1 oz., etc., can be readily adjusted simply by changing plugs.

The relation of the ball diameter to the inside diameter of the pouring tube 30 is important; these two diameters should be very close to being the same. Apparently as the pouring tube is wetted by passage of liquid thereinto through plug opening 36, the capillary attraction of the liquid between the wall of the tube and the ball creates a momentary vacuum adjacent the plug 34. This prevents the ball 42 from moving toward the ball seat 38 until the ingress of more liquid through opening 36 releases the vacuum, whereupon the ball moves toward the ball seat 38 and shuts off further liquid flow through the tube. Thus, the larger the opening 36, the more quickly the ball 42 is released and the less liquid dispensed for each tilting of the pourer. Conversely, the smaller the plug opening 36, the more liquid dispensed for each tilting of the pourer.

In the adaptation of the pourer for dispensing alcoholic beverages, an inside tube diameter of .255 inch and a ball diameter of .250 inch has been found to be about optimum.

The length of tube 30 is not critical since in general the tube length is sufficiently short, e.g. 2–3 inches, to enable emptying of the bottle and long tube lengths are not desired.

To prevent inadvertent loss of liquid through the vent opening 18 of the pourer spout 16, a unique assemblage of the vent and pouring tubes with the pourer body 12 is provided. This assemblage comprises a circular mounting plate 44 having a centrally disposed opening therein from which depends a tubular collar 46. The vent tube 28 and the pouring tube 30 extend through this collar and are attached thereto by soldering or other convenient means. The upper end of the vent tube 28 terminates on a plane level with the surface of the plate. The pourer tube 30 extends upwardly beyond the surface of the mounting plate 44.

As thus assembled, the assembly is mounted on the pourer body 12 by simply inserting the mounting plate 44 in the recess 22 opening into the base of the pourer body so that the plate seats against the annular shoulder 26, where it is attached by any suitable means as by welding, peening, soldering, braising, etc. to form a seal closing off the inner chamber 24 within the base of the pourer body 12. The upper end of the pourer spout 30 extends through chamber 24 and seats within a recess 48 formed in the pourer body adjacent the lower end of the pouring passage 20 of this body.

The mounting plate 44 is mounted in such a manner that the vent tube 28 is offset from the vent passage 18 (note FIGURES 4 and 5) in the pourer body 12 so that any liquid which flows up the vent tube 28 as the pourer is tilted is trapped in the chamber 24 and does not pass into the vent passage 18.

The resulting measuring pourer is lightweight, and has the appearance of a free-flow pourer while providing wide versatility in the quantity of liquid measured by the simple replacement of one plug such as 34 for another.

In the foregoing description, a preferred embodiment of the invention has been described to enable a proper understanding of the invention. Since numerous modifications and changes will readily occur to those skilled in the art which do not depart from the spirit of the invention, it is to be understood that the invention is not limited to the precise embodiment described, but embraces such equivalent modifications thereof as fall within the scope of the appended claims.

What I claim is:
1. A measuring pourer for dispensing liquid from the mouth of a bottle, said pourer comprising a body having a pouring and a vent opening therein, pouring and vent tubes depending from said body and communicating at their upper ends with said pouring and vent openings respectively, said vent tube and said pouring tube being separated from one another throughout their lengths, said pouring tube having a ball seat at its upper end, a removable plug closing its lower end, and an opening in the wall thereof for passage of liquid in quantity thereinto, a ball having a diameter only slightly smaller than the inner diameter of said pouring tube while freely movably disposed within said pouring tube and adapted to seat against said ball seat, said plug having an opening therein whereupon as said pourer is tilted from the vertical past the horizontal the amount of liquid flow through said pourer is regulated by the size of said plug opening which controls movement of the ball along said pouring tube to said seat to shut off the flow of liquid therethrough.

2. A measuring pourer comprising a pourer spout having vent and pouring openings therein and having a recess in the base thereof with which said openings communicate, a vent and pouring tube assembly comprising a mounting plate having a central opening, a collar depending from said plate in axial alignment with said central opening, and vent and pouring tubes carried within said collar, the upper end of said vent tube terminating at a level no higher than the surface of said mounting plate and the upper end of said pouring tube projecting above the surface of said mounting plate, said mounting plate being mounted within said base recess and forming a hollow chamber within said pourer base, said vent tube opening into said hollow chamber and being axially offset from said vent opening to prevent inadvertent liquid flow through said vent opening, said pouring tube extending through said chamber and terminating therebeyond in communication with said pouring opening, said pouring tube having a closed lower end with a vent hole therethrough and an open upper end having a valve seat, a ball freely movably disposed within said pouring tube and adapted to seat against said valve seat and stop the flow of liquid through said pouring tube upon tilting of the pourer, said tube having at least one liquid opening in the side wall thereof.

3. A measuring pourer for dispensing liquid from the mouth of a bottle, said pourer comprising a body having a pouring opening and a vent opening therein, a pouring tube and a vent tube depending from said body and communicating at their upper ends with said pouring and vent openings respectively, said vent tube and said pouring tube being separated from one another throughout their lengths, said pouring tube having a ball seat at its upper end, a removable plug closing its lower end, and an opening in the wall thereof for passage of liquid in quantity thereinto, a ball having a diameter only slightly smaller than the inner diameter of said pouring tube freely movably disposed within said pouring tube and adapted to seat against said ball seat, said plug having an opening therein whereupon as said pourer is tilted from the vertical past the horizontal the amount of liquid flow through said pourer is regulated by the size of said plug opening which controls movement of the ball along said pouring tube to said seat to shut off the flow of liquid therethrough, said body having a chamber therein between the upper end of said vent tube and said vent opening, said vent opening opening into the top of said chamber, and said vent tube opening into the bottom of said chamber axially offset from said vent opening to prevent inadvertent liquid flow through said vent opening.

References Cited by the Examiner
UNITED STATES PATENTS

| 527,726 | 10/1894 | Schneider et al. |
| 1,654,810 | 1/1928 | Hillyard _____ 222—500 X |
| 2,368,540 | 1/1945 | Goodman _____ 222—477 |
| 2,968,423 | 1/1961 | Mahler et al. _____ 222—500 X |

FOREIGN PATENTS

| 1,133,650 | 7/1962 | Germany. |

M. HENSON WOOD, JR., *Primary Examiner.*

LOUIS J. DEMBO, A. N. KNOWLES,
*Assistant Examiners.*